(12) United States Patent
Biskeborn et al.

(10) Patent No.: US 7,742,252 B2
(45) Date of Patent: Jun. 22, 2010

(54) APPARATUS, SYSTEM, AND METHOD FOR CONTROLLING RECORDING HEAD SUBSTRATE BIAS VOLTAGE

(75) Inventors: Robert Glenn Biskeborn, Hollister, CA (US); Stanley W. Czarnecki, Palo Alto, CA (US); Icko E. T. Iben, Santa Clara, CA (US); Larry LeeRoy Tretter, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 667 days.

(21) Appl. No.: 11/670,404

(22) Filed: Feb. 1, 2007

(65) Prior Publication Data

US 2008/0186613 A1 Aug. 7, 2008

(51) Int. Cl.
*G11B 5/03* (2006.01)
(52) U.S. Cl. .................................. 360/66; G9B/5.031
(58) Field of Classification Search ................. None
See application file for complete search history.

(56) References Cited

U.S. PATENT DOCUMENTS

| | | | |
|---|---|---|---|
| 4,716,306 A | 12/1987 | Sato et al. ............... 307/296 R |
| 5,701,213 A | 12/1997 | Cameron et al. .............. 360/66 |
| 5,790,334 A | 8/1998 | Cunningham ................ 360/66 |
| 5,917,680 A | 6/1999 | Valstyn et al. .............. 360/113 |
| 6,067,200 A | 5/2000 | Ohba et al. ................... 360/66 |
| 6,252,735 B1* | 6/2001 | Chung et al. .................. 360/67 |
| 6,341,046 B1 | 1/2002 | Peterson ...................... 360/67 |
| 6,751,039 B1 | 6/2004 | Cheng et al. .................. 360/66 |
| 6,847,501 B2* | 1/2005 | Cheung et al. ................ 360/46 |
| 2007/0230008 A1* | 10/2007 | Shinomiya et al. ........... 360/66 |

\* cited by examiner

*Primary Examiner*—Daniell L Negrón
(74) *Attorney, Agent, or Firm*—Kunzler Needham Massey & Thorpe

(57) ABSTRACT

An apparatus, system, and method are disclosed for dynamically controlling a recording head substrate bias voltage. The apparatus includes a midpoint module and a substrate module. The midpoint module calculates a midpoint voltage of a plurality of data read elements and servo read elements contained in the head. The substrate module calculates a substrate bias voltage. The apparatus, system, and method dynamically control the substrate bias voltage post-assembly, minimizing certain head degradations and extending the life of associated head readers.

19 Claims, 8 Drawing Sheets

APPARATUS, SYSTEM, AND METHOD FOR CONTROLLING RECORDING HEAD SUBSTRATE BIAS VOLTAGE

BACKGROUND

1. Field of Art

This invention relates to controlling magnetic recording head substrate bias voltage and more particularly relates to calculating a midpoint voltage of a transducing element in the head and calculating a preferred substrate bias voltage.

2. Background Technology

Since the IBM 726 in 1952, the magnetic recording industry has continuously improved upon the performance and capacity of drives and media to accommodate the insatiable demand for larger and superior storage.

Tape drives and hard disk drives employ heads having write and read transducing elements to record and read data on their respective magnetic physical media, but in different ways. A tape drive head usually consists of multiple write and read transducers laid out perpendicular to the tape media to access multiple tracks at one time, whereas a hard disk drive typically employs heads having single read and write transducers per disk surface.

Very early on a single transducer was used for both writing and reading. These drives use heads having inductive transducers, which are essentially spiral coils wrapped between two layers of magnetic material. Writing to the physical media is achieved by applying an electrical current through the coil to produce a magnetic field, which forms a series of magnetic flux patterns on the surface of the physical media. The direction of the magnetic field depends on the direction of the applied current. Reading from the physical media involves the opposite principle: applying a magnetic field to the coil. In other words, gliding the head over the recorded magnetic flux pattern on the physical media causes an electrical current to flow in the coil. The electrical current corresponds to the orientation of the previously recorded magnetic field, where, in binary terms, a transition indicates a 1, and no transition implies a 0.

As recording technology advances, using a single coil for both writing and reading limits performance, since in many cases improving the inductive coil for reading adversely affects the writing performance, and vice-versa. Furthermore, in order to increase the track density, data is written to a wider data track and read from a narrower region of the written track, thereby minimizing misregistration between readers and written tracks. Separating the read-write transducer into separate read and write transducers allowed each to be optimized solely for their specific function.

In order to satisfy demand for increased areal density, modern drives switched from inductive read elements to magneto-resistive (MR) read elements and more recently to giant magneto-resistive (GMR) elements. Generally, "head" refers to the entire structure consisting of substrate, closure, transducers, etc. However, it is common practice also to refer to the MR sensors and write transducers as "heads," and this practice will be followed hereinafter. The correct technical name for first-generation MR heads is anisotropic magneto-resistive (AMR), but traditionally they have just been called "magneto-resistive" (MR). Unlike the induced currents of an inductive head, MR heads work via the MR effect, where MR material changes electrical resistance in the presence of a magnetic field and, thus, detects transitions in the magnetic field representative of recorded data. MR heads contain a sensing layer, or stripe, which includes the MR material. A bias current is applied to the stripe and changes in the voltage across the sensor are measured. The total DC voltage across the stripe is the product of the bias current times the stripe resistance. The stripe resistance varies with the stripe magnetization, which is a combination of internal magnetization and external magnetization. As is well known, the voltage drop across MR heads is typically in the range of several tenths of volt or higher. This dc voltage appears at the surface of the head whenever the bias is turned on.

For proper read back detection, the MR sensors require magnetically permeable shields. The shields are fabricated on both sides of the sensor stripe. The two shields form the magnetic sense gap. The spacing between the shields sets the frequency response of the head. The sensor is located approximately in the mid-plane between the shields. As is well known in the art, the shield spacing must be in the range of 0.1 to 1.0 micrometer. The insulation layer between shields and sensor is even smaller, often only a few hundred Angstroms or less. As is well known in the art, the shields may be electrically connected to the MR leads via thin film resistors. Further, writer poles may be electrically connected to a neighboring MR shield pair. When so connected, all poles and shields are clamped to a voltage that is derived from the MR sensor.

Modern linear tape drives typically write multiple tracks simultaneously on each pass of the bidirectional tape media. Additionally, the recording heads in tape drives usually have two modules, each of which contains both read and write elements. The modules face each other so that an MR head read element on one head module faces a Thin Film Inductive (TFI) head write element on the opposite head module. This way, the data that is being written with a TFI write element from one module can be verified by the MR read element on the opposite module on each pass of the tape.

In addition to specialized read and write elements, many tape drives employ servo control, or "servoing", via a servo read element in order to keep the read and write elements in line with the tape media. The servo read elements are similar to data readers. Advanced tape drives may employ a timing-based servo (TBS) to provide very precise position information to the drive. Tapes are factory-formatted with the TBS pattern, in which the obliquely written patterns are used to indicate position information. For instance, the physical media may be divided into four separate bands. Each band may be further divided. For example, each band may have twelve TBS positions, or six for each direction of tape travel, which would give a total of 24 unique positions for writing data to the tape.

Tape drives may incorporate redundant servo elements so that if a servo reader becomes temporarily defective or a portion of the pre-written servo track is corrupted, the redundant servo reader will keep the head in line with the track locations on the tape for the duration of the defect.

All the heads of a head module, the read, write and servo heads, are fabricated on a head substrate. The choice of the substrate has varied over the years, but in all cases, in order to protect the small, sensitive magnetic recording elements, the substrates are made of hard materials which have minimum wear when rubbed by tape. One example of a material is a hard ferrite which may also serve as a magnetic shield for the sensors. Another choice, and the one used in many hard disk drive and tape drive products, is a hard ceramic made of HIPed Alumina and Titanium Carbide (AlTiC). In the case of ferrites, the substrate is insulative, while in the case of AlTiC, the substrate may be conductive. In this case, as is well known, it is preferable to clamp the substrate voltage to a pre-set value.

The response of an MR read element to a magnetic field, defined as the device transfer curve, is non-linear. Therefore, in order to acquire an undistorted reproduction of a recorded magnetic field, the magnetization of the sensing layer of the MR read element is biased. As is well known in the art, the bias current through the MR read element is programmed so as to minimize the signal distortion. However, this may result in some MR elements getting programmed with an excessively high bias current. Raising bias current increases both MR temperature and voltage and shield and write pole voltages.

The bias current is programmed based on performance parameters of each MR head, typically in a range of 4-15 milliamps. The MR head substrate bias voltage is set to a preset voltage value, typically 0, 1.5, 3.0 volts, achieved with a fixed voltage divider connected to a supply voltage. It is determined pre-assembly and, once the drive is assembled, is not adjusted despite natural degradation in the MR head elements. Since modern linear tape drives have 8, 16, or more active channels, there may be as many different bias current values in each module.

Furthermore, the reader elements are resistors and conduct electric current. They operate at a voltage that may be very different than the triboelectric voltage on the surface of the magnetic physical media. This difference is associated with such phenomena as electro-chemical depositions upon the magnetic physical media and stripe oxidation, as well as other deleterious effects. Besides causing resistance increases in the sensing layer and consequential degradation of the sensing amplitude, such variations have been the cause of "head shorting," where the physical media shorts the MR sensor to its shields. In addition, parasitic conductive paths between head substrate and MR shields may develop over time with the passage of tape over the head. If the resistance of these parasitic paths is low enough, the substrate voltage itself can change, where the magnitude of change depends on the substrate bias circuit and other resistors. Furthermore, under normal operating conditions, current tape drives are unable to at detect and adapt to these measurable changes in the performance of head elements.

From the foregoing discussion, it should be apparent that a need exists for an apparatus, system, and method that overcome the limitations of conventional substrate biasing method. In particular, such an apparatus, system, and method would beneficially control substrate bias dynamically, thereby avoiding the drawbacks associated with a fixed substrate bias voltage. The apparatus, system, and method would also beneficially provide in-drive recalibration in the event of a variation in resistance in any of a plurality of head elements associated with a module.

SUMMARY OF THE INVENTION

The several embodiments of the present invention have been developed in response to the present state of the art, and in particular, in response to the problems and needs in the art that have not yet been fully solved by currently available substrate voltage biasing methods. Accordingly, the present invention is an apparatus, system, and method to dynamically adjust substrate bias voltage that overcome many or all of the above-discussed shortcomings in the art.

A substrate bias voltage apparatus is provided with a logic unit containing a plurality of modules for dynamically adjusting the substrate bias voltage to achieve a preferred value. These modules in the described embodiments include a midpoint module, a substrate module, and a recalibration module. Further embodiments include a measure module, a sum module, and weighting module, a select module, a program module, and a recurrence module.

The apparatus, in one embodiment, determines the preferred substrate bias voltage value as a function of an average of calculated MR element midpoint voltages. The apparatus is implemented in firmware, within the storage controller. Additionally, the activation of the apparatus may be determined by the storage controller.

In one embodiment, the midpoint module calculates midpoint voltages with respect to ground for each of the reader elements, namely data read elements and servo read elements, associated with a head module. Additionally, the midpoint voltages may be calculated for each MR as a function of its known bias current and its measured head resistance.

In one embodiment, the measure module measures the resistance at of each of a plurality of data read elements and servo read elements associated with the module. Once the resistance of each reader element is measured, and knowing the bias current as well as the value of the bias resistors, which have the same value, the midpoint voltage of each reader element with respect to ground may be calculated.

After performing this series of calculations then an average may be performed that determines the preferred value for the substrate bias voltage associated with a head module. In one embodiment, the substrate module calculates the preferred substrate bias voltage for a head substrate as a function of an average of the previously calculated MR midpoint voltages.

In order to calculate the preferred substrate bias voltage, the total number of reader elements is determined. In one embodiment, the sum module may determine the sum total of data read elements and servo read elements associated with a module.

Next, the weighting module may store a value for a weighting factor that gives preference to data read elements or servo read elements in calculating the preferred substrate bias voltage. For very large values of the weighting factor the effect of the midpoint voltage values of the data read elements on the calculated substrate bias voltage is minimized, and effectively only the midpoint voltage values of the servo read elements determine the value of substrate bias voltage. Conversely, when the weighting factor is set to zero, the midpoint voltage values of the servo read elements are neglected in the calculation of the substrate bias voltage, and only the midpoint voltage values from the data read elements are used to determine the preferred substrate bias voltage.

Once the total number of reader elements, and midpoint voltage values of each head reader element are known, and the weighting factor determined, the preferred substrate bias voltage may be calculated. In one embodiment, the firmware of the storage device calculates the head midpoint voltage and preferred substrate bias voltage.

If, for a given design of head module, it is found that only certain head reader elements or head servo elements are required to set the substrate bias voltage value at or near the calculated head midpoint voltage value, then the select module may select a number of data read elements and servo read elements from among the sum total of reader elements associated with a module. In one embodiment, the select module may be implemented in firmware to select the reader elements.

Once the substrate module calculates the preferred substrate bias voltage, the program module may program the substrate bias voltage. In one embodiment, the program module programs a bias circuit to supply the preferred substrate bias voltage.

In order to remedy normal degradations as a function of wear, in addition to other potential variations to a sensing layer of the head reader element, it may be beneficial to recalibrate the substrate bias voltage. In one embodiment, the recalibration module recalibrates the substrate bias voltage. The recalibration module includes the recurrence module. In one embodiment, the recurrence module may be configured to store a recurring period for the recalibration module.

A system of the present invention is also presented to dynamically control a substrate bias voltage. The system may be embodied as a storage device, the storage device configured to store and access data on a storage medium.

In particular, the system, in one embodiment, includes a head having a plurality of MR head elements. The system also includes a storage controller configured to control read-write operations of the plurality of head elements, and an apparatus coupled to the storage controller, the apparatus configured to determine a preferred substrate bias voltage. In a further embodiment, the system may also include firmware coupled to the storage controller, the firmware configured to perform operations to derive the preferred substrate bias voltage, and a bias circuit configured to supply the preferred bias voltage to the substrate.

A signal bearing medium is also presented to store a program that, when executed, performs operations dynamically to control a substrate bias voltage. In one embodiment, the operations include calculating a midpoint voltage of a head element as a function of a bias current and a head resistance, and calculating a preferred substrate bias voltage as a function of an average of sensor midpoint voltages.

In another embodiment, the operations may include programming the preferred substrate bias voltage, determining the number of data read elements and servo read elements of the plurality of head elements associated with a module, selecting a number of data read elements and servo read elements among the plurality of head elements, and determining a value for a weighting factor that gives preference to data read elements or servo read elements in calculating the substrate bias voltage.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. It is to be understood that these drawings depict only typical embodiments of the invention and are not therefore to be considered to be limiting of its scope, and therefore, the invention will be described and explained with additional specificity and detail through the use of the accompanying drawings, in which.

DETAILED DESCRIPTION

Many of the functional units described in this specification have been labeled as modules, in order to more particularly emphasize their implementation independence. For example, a module may be implemented in hardware as a circuit or circuits.

Modules may also be implemented in software for execution by various types of processors. An identified module of executable code may, for instance, comprise one or more physical or logical blocks of computer instructions which may, for instance, be organized as an object, procedure, or function.

Figure 1:
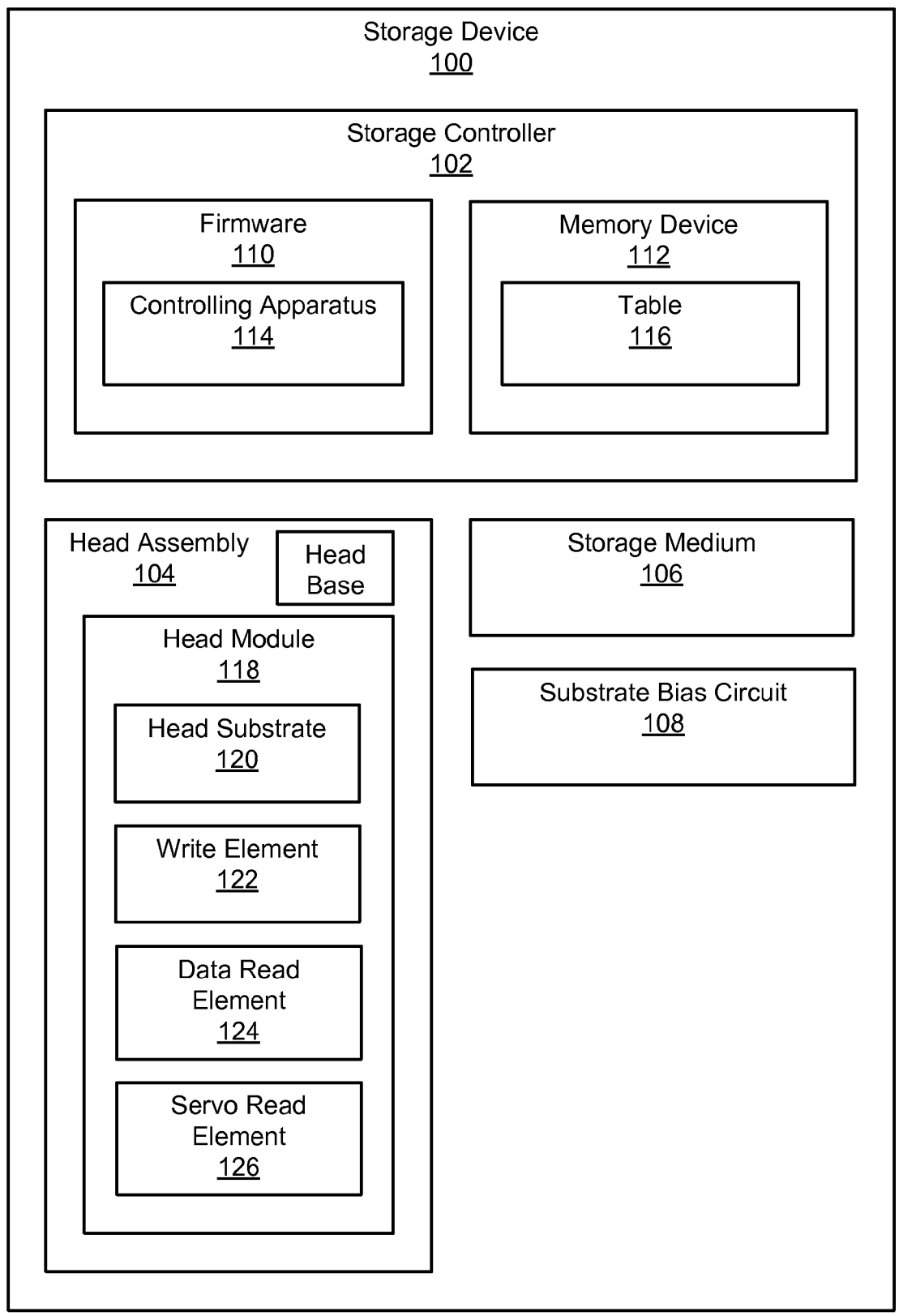
FIG. 1 is a schematic block diagram illustrating one embodiment of a storage device.

FIG. 1 depicts a schematic block diagram of one embodiment of a storage device 100. The illustrated storage device 100 includes a storage controller 102, a head assembly 104, a storage medium 106, and a substrate bias circuit 108. The storage device 100 may store and access data on the storage medium 106 according to the I/O operations of the storage controller 102. In certain embodiments, the storage device 100 may include a single storage medium 106 or a plurality of storage media 106.

The illustrated storage controller 102 includes firmware 110 and a memory device 112. The storage controller 102 may be configured to control read-write operations of the head assembly 104, determining how data will be written and accessed on the storage medium 106. The storage controller 102 may also be configured to act as a communication interface between certain components of the storage device 100.

In one embodiment, the storage controller 102 executes firmware 110 that may be stored on a non-volatile semiconductor or other type of memory device. Many of the operations of the storage controller 102 are determined by the execution of the firmware 110. The illustrated firmware 110 includes a controlling apparatus 114. In general, the controlling apparatus 114 may implement a scheme to establish a head substrate bias voltage. One example of the substrate biasing apparatus 114 is shown and described in more detail with reference to FIG. 2.

The illustrated memory device 112 includes an optimization table 116. The memory device 112 may act as a buffer to increase the I/O performance of the storage device 100, as well as store microcode designed for operations of the storage device 100. The memory device 112 may consist of one or more non-volatile semiconductor devices, such as a flash memory.

The memory device 112 includes a table 116 configured to store values pertaining to the process of the controlling apparatus 114. The table 116 may be implemented for the collection of empirical data gathered from the controlling process. The data stored in the table 116 may also be used to recover and restore all settings in the occurrence of an unexpected event such as a forced system reset, or unexpected loss of power. In one embodiment, the table 116 is stored on the same memory device 112 as the storage controller buffer. In another embodiment, the table 116 is stored on the actual storage medium 106 or on a separate memory device.

The illustrated head assembly 104 includes at least one head module 118. In one embodiment, the head assembly 104 includes two head modules 118 mounted face to face so as to make possible bi-directional read-write operations. The head module 118 includes a head substrate 120 upon which a plurality of write elements 122, data read elements 124, and servo read elements 126 are fabricated.

The illustrated storage medium 106 may be configured to store bits of data as magnetic fields of the storage medium 106 physical surface. The storage medium 106 may be a magnetic tape cartridge, hard disk drive, or another similar medium. In one embodiment, the storage device 100 may include a fixed storage medium 106. In another embodiment, the storage device 100 may include a removable storage medium 106.

The illustrated substrate bias circuit 108, shown and described in more detail with reference to FIG. 4, may be configured to supply a preferred voltage to the head substrate 120.

Figure 2:
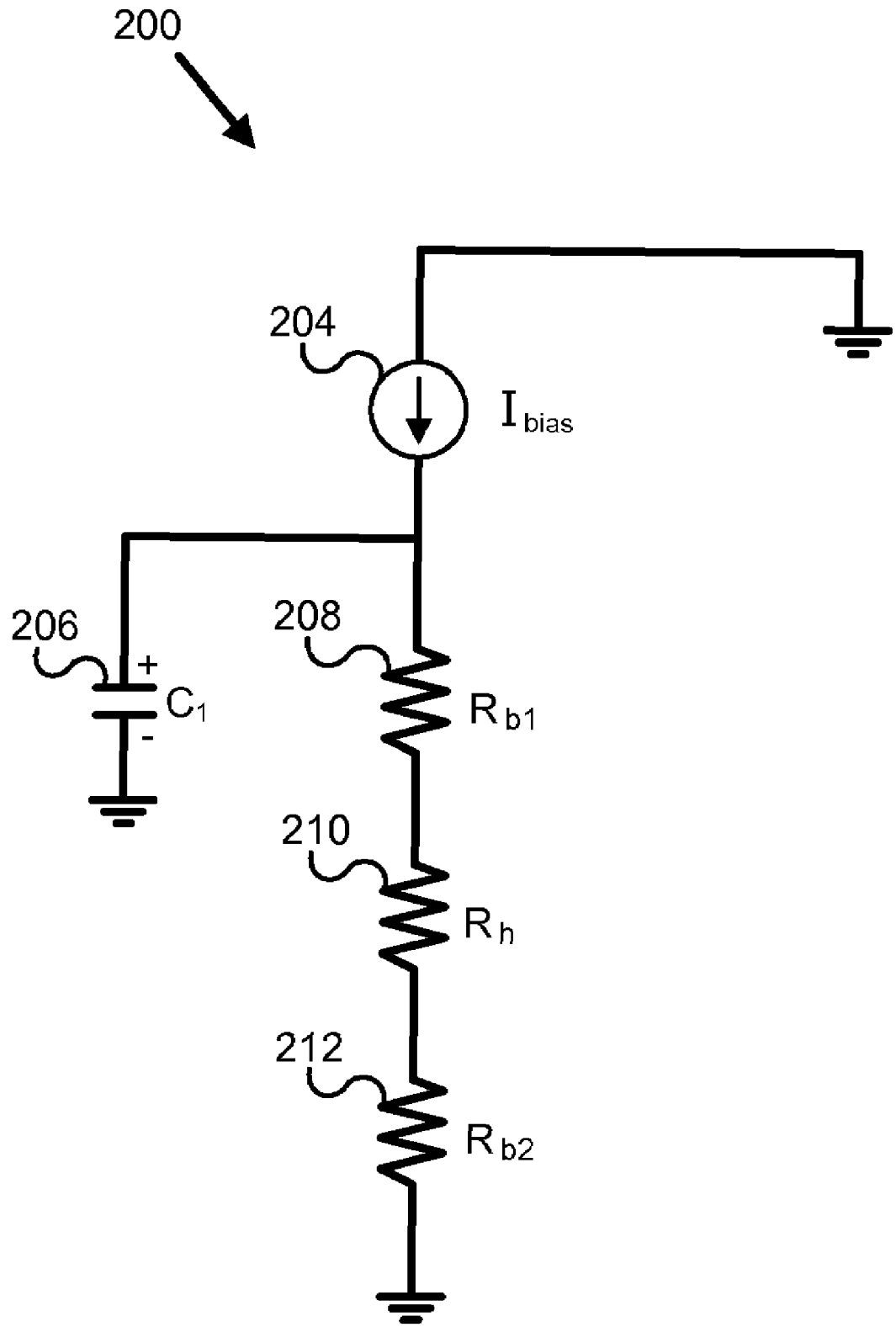
FIG. 2 is a schematic diagram illustrating one embodiment of an MR head bias circuit.

FIG. 2 depicts a schematic diagram of one embodiment of a magneto-resistive (MR) bias current circuit 200 in association with head assembly 104. The MR bias circuit 200 depicts one technique used to bias an MR data read element 124 or MR servo read element 126. The bias circuit 200 includes a programmable bias current $I_{bias}$ 204, a capacitor C1 206, a first bias resistor $R_{b1}$ 208, a second bias resistor $R_{b2}$ 212, and an MR sensor $R_h$ 210.

Based on performance parameters of each MR reader element the bias current 204 is programmed to typical values between 2 and 15 milliamps. A head reader element refers generally to either a data read element 124 or a servo read element 126 or both. The capacitor C1 206 may be configured to filter current fluctuations from the primary power source for the head bias current circuit 200. The bias resistor $R_{b1}$ 208 and bias resistor $R_{b2}$ 212 typically are the same value, and act as a high-impedance voltage divider. $R_h$ 210 is the sensing layer resistance of a reader element.

Figure 3:
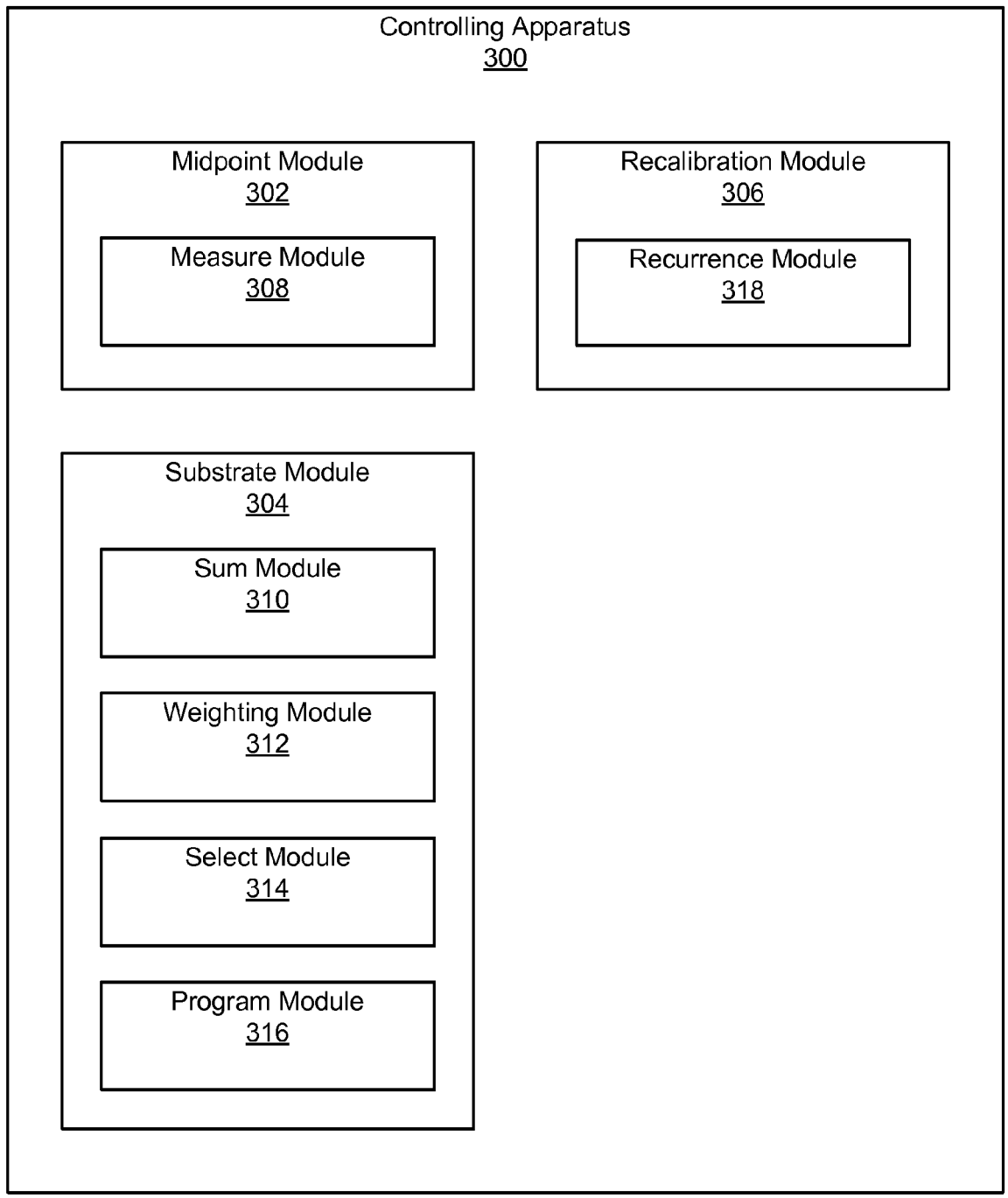
FIG. 3 is a schematic block diagram illustrating one embodiment of a controlling apparatus.

FIG. 3 depicts a schematic block diagram of one embodiment of an apparatus 300 that may be substantially similar to the apparatus 114 of FIG. 1. The illustrated apparatus 300 includes a midpoint module 302, a substrate module 304, and a recalibration module 306.

In one embodiment, the controlling apparatus 300 is implemented in firmware 110, within the storage controller 102. The activation of the illustrated apparatus 300 may be determined by the storage controller 102, in association with the firmware 110. In another embodiment, the apparatus 300 may be implemented in a program stored directly on the storage medium 106.

The optimization apparatus 300 controls a process to determine the preferred substrate bias voltage as a function of an average of calculated MR midpoint voltages. It has been determined that the substrate bias voltage, in order to avoid the problems and risks associated with current solutions, such as the previously discussed degradations, is preferably set at or near the sensor midpoint voltage with respect to ground.

The illustrated midpoint module 302 includes a measure module 308. The measure module 308 measures the resistance of a reader element. In one embodiment, the measure module 308 measures the resistance of each of a plurality of data read elements 124 and servo read elements 126 associated with a head module 118. In one embodiment, the midpoint module 302 calculates a midpoint voltage with respect to ground for each of the reader elements, namely data read elements 124 and servo read elements 126, as a function of a known bias current known biasing resistors and a measured head resistance. The midpoint voltage of each head reader element with respect to ground may be calculated, as follows:

$$V_{midpoint} = I_{bias}\left[\left(\frac{R_h}{2}\right) + R_{b2}\right]$$

In other embodiments, the midpoint voltage may be calculated according to other formulas that depend on some or all of the variables described above.

In one embodiment, the substrate module 304 calculates the preferred substrate bias voltage for substrate 120 as a function of an average of the previously calculated midpoint voltages. The illustrated substrate module 304 includes a sum module 310, a weighting module 312, a select module 314, and a program module 316.

In one embodiment, the sum module 310 may determine the total number of data read elements 124, m, and servo read elements 126, n, associated with module 118. For example, in a typical eight channel head assembly 104, such as in a linear tape-open (LTO) tape drive, each of the two facing modules 118 contains eight data read elements 124, and two servo read elements 126 (n=2).

In one embodiment, the weighting module 312 may determine a value for a weighting factor that gives preference to data read elements 124 or servo read elements 126 in calculating the preferred substrate bias voltage. The weighting factor, $K_w$, may be defined such that for values of $K_w>1$, the servo read elements 126 contribute more to the calculated head midpoint voltage than by strict averaging. Then for larger values of $K_w$, the effect of the midpoint voltages of the data read elements 124 on the calculated substrate bias voltage is minimized. In this case, the midpoint voltages of the servo read elements 126 substantially determine the substrate bias voltage value. Conversely, when $K_w=0$, the midpoint voltage values of the servo read elements 126 are neglected in the calculation of the substrate bias voltage. In this case, the midpoint voltage values from the only data read elements 124 determine the substrate bias voltage.

With the total number of data read elements 124, m, the total number of servo read elements 126, n, the midpoint voltages of the data read elements 124, $V_{mpd1}$, $V_{mpd2}$, ... $V_{mpdm}$, the midpoint voltages of the servo read elements 126, $V_{mps1}$, $V_{mps2}$, ... $V_{mpdn}$, and the weighting factor, $K_w$, the preferred substrate bias voltage may be defined, as follows:

$$V_{\text{substrate\_bias}} = \frac{(V_{mpd1} + V_{mpd2} + \ldots V_{mpdn}) + (V_{mps1} + V_{mps2} + \ldots V_{mpsn}) \times K_w}{m + (n \times K_w)}$$

In other embodiments, the preferred substrate bias voltage may be calculated according to other formulas that depend on some or all of the variables described above.

If, for a given design of the module 118, only certain reader elements are chosen to set the substrate bias voltage value at or near the calculated midpoint voltage value, then the select module 314 selects only those data read elements 124 and servo read elements 126 from among the total of reader elements associated with the module 118.

Once the substrate module 304 calculates the preferred substrate bias voltage, the program module 316 may supply the voltage. In one embodiment, the program module 316 programs a bias circuit 108 to supply the selected voltage to the substrate 120.

The substrate bias voltage is preferably set at or near the calculated MR midpoint voltage of the data 124 and servo 126 read elements. However, as previously discussed, over the life of a head assembly 104, the individual head reader elements of module 118 may experience degradation as a function of wear, in addition to other potentially detrimental effects on the sensing layer of the reader element. Changes in the sensing layer of the reader element may alter the midpoint voltages creating a discrepancy between the current voltages and the previously calculated midpoint voltages. In order to account for these changes, the substrate bias voltage may be recalibrated.

In one embodiment, the recalibration module 306 recalibrates the substrate bias voltage to compensate for changes due to wear, etc. The illustrated recalibration module 306 includes a recurrence module 318. The recurrence module 318 may be configured to store a recurring period for the recalibration module 306. In one embodiment, the recurrence module 318 compares the present midpoint voltage values to the previously calculated midpoint voltage values and determines whether the discrepancy between them warrants prompting the recalibration module 306 to recalibrate the substrate bias voltage. In another embodiment, the recurrence module 318 may simply notify the recalibration module 306 to recalibrate the substrate bias voltage in a predetermined interval. In a further embodiment, the predetermined interval may be determined by empirical data gathered from the table 116.

Figure 4:
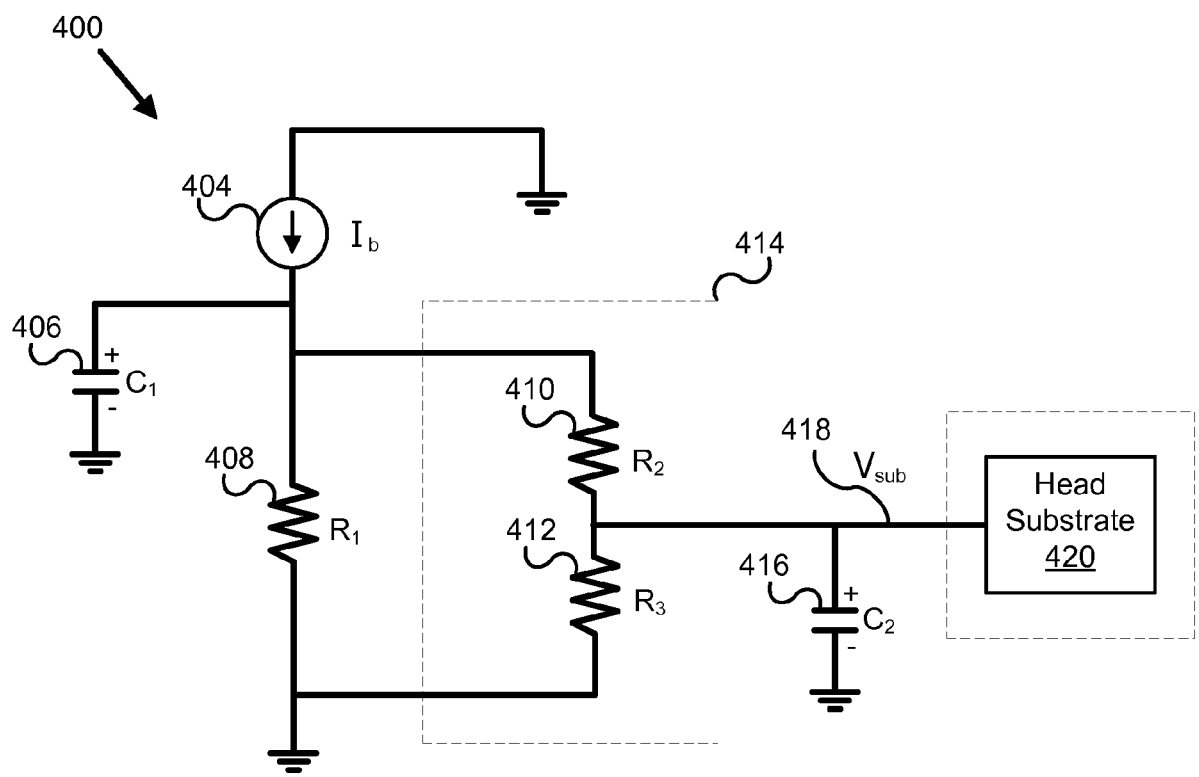
FIG. 4 is a schematic diagram illustrating one embodiment of a substrate bias circuit.

FIG. 4 depicts a schematic diagram of one embodiment of a substrate bias circuit 400. The illustrated substrate bias circuit 400 is just one example of a circuit to generate the preferred substrate bias voltage. The substrate bias circuit 400 includes a current source $I_b$ 404, capacitors $C_1$ 406 and $C_2$ 416, resistors $R_1$ 408, $R_2$ 410 and $R_3$ 412, to which the substrate 420 is connected. The substrate 420 is substantially similar to the substrate 120 of FIG. 1.

After the substrate module 304 calculates the preferred substrate bias voltage, the circuit 400 may supply the calculated bias voltage $V_{sub}$ 418 to the substrate 420. For example, to produce a bias voltage of 1.5 volts, the current source $I_b$ 404 would be programmed to produce 3 volts across the resistor $R_1$ 408. A suitable value for $R_1$ is 350 ohms. The high impedance voltage divider 414, using $R_2$ 410 and $R_3$ 412, will then produce the preferred voltage of 1.5 volts if the values of R2 and R3 are 35 K ohms for example, which is supplied to the head substrate 420. The capacitors $C_1$ 406 and $C_2$ 416 may be configured to shunt away and filter out current fluctuations from the primary power source.

Figure 4A:
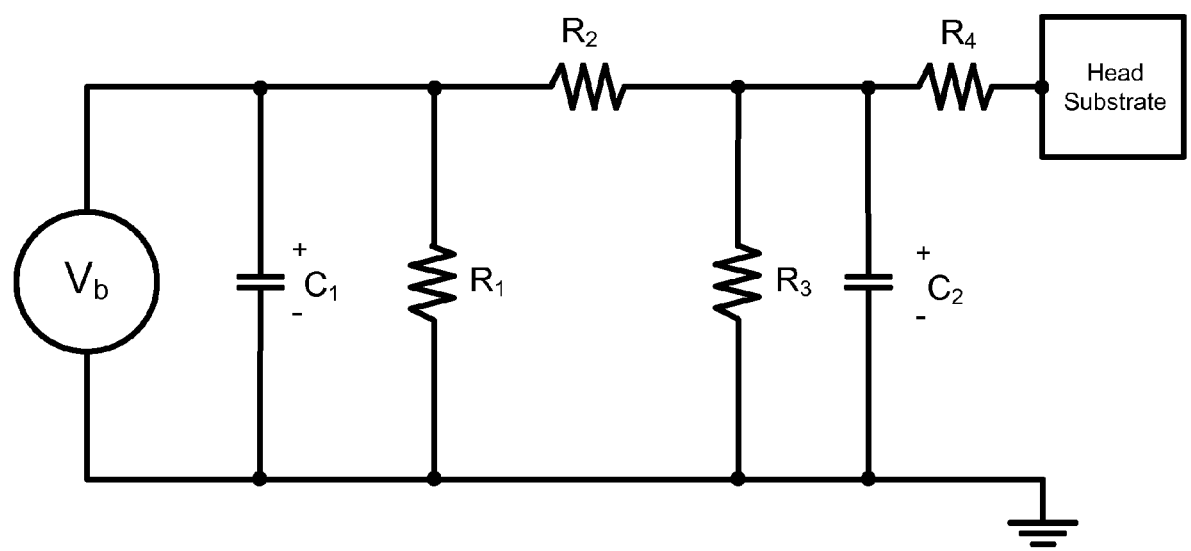
FIG. 4A is a schematic diagram illustrating one embodiment of a substrate bias circuit.

The circuit of FIG. 4A uses a programmed voltage supply $V_b$ to apply the preferred substrate voltage to the head substrate through the divider $R_2$ and $R_3$. In addition, the optional resistor $R_4$ may be used to adjust the impedance between head substrate and applied voltage for controlling the tribocurrents that flow between head substrate and tape, as is well known in the art. In general, $R_4$ in the range of 10-100 kohms is preferred for limiting the flow of current but is not so large as to result in an increase in the substrate voltage itself due to tribocharging.

Figure 5A:
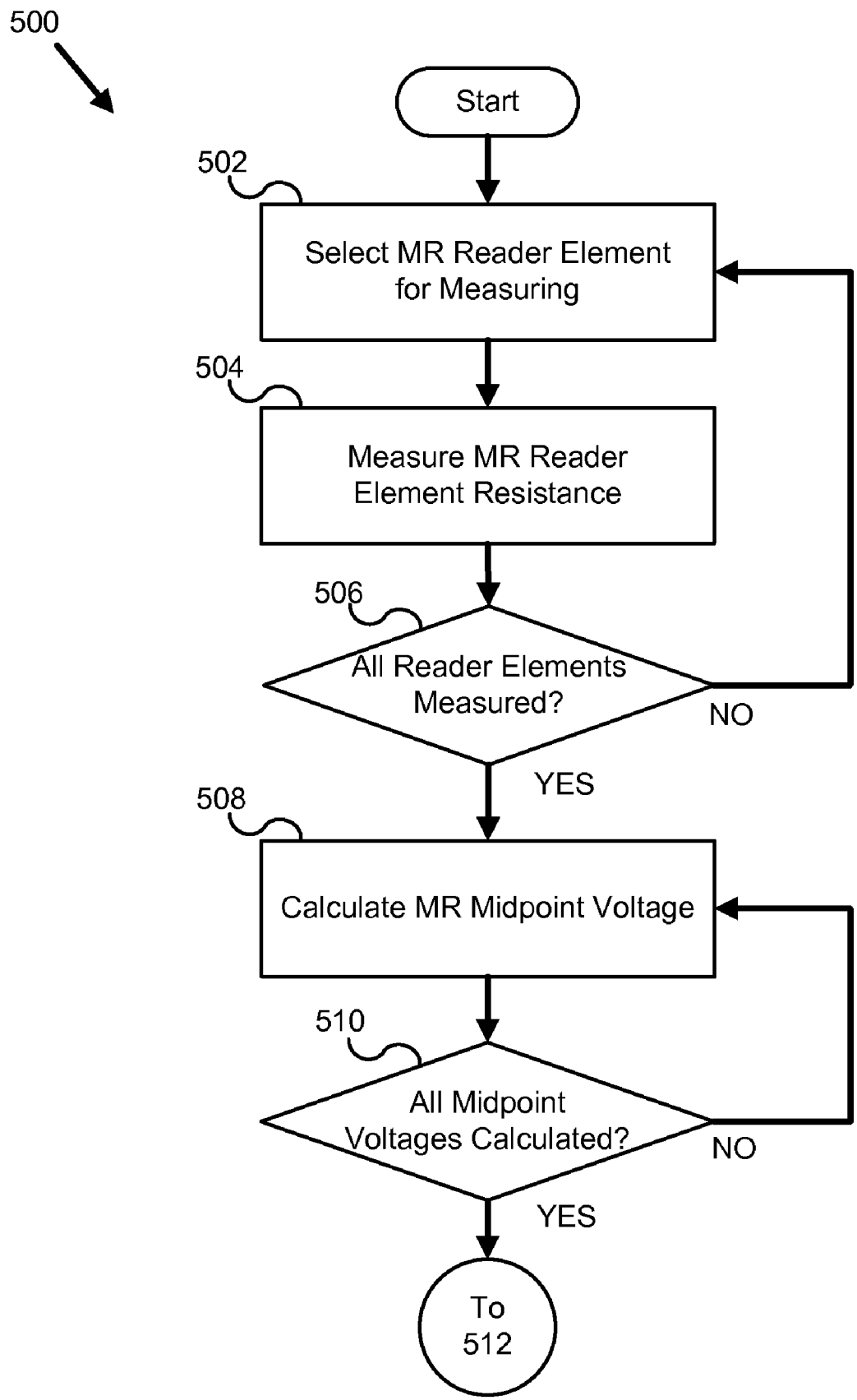
FIGS. 5A and 5B are schematic flow chart diagrams illustrating one embodiment of a controlling method.
Figure 5B:
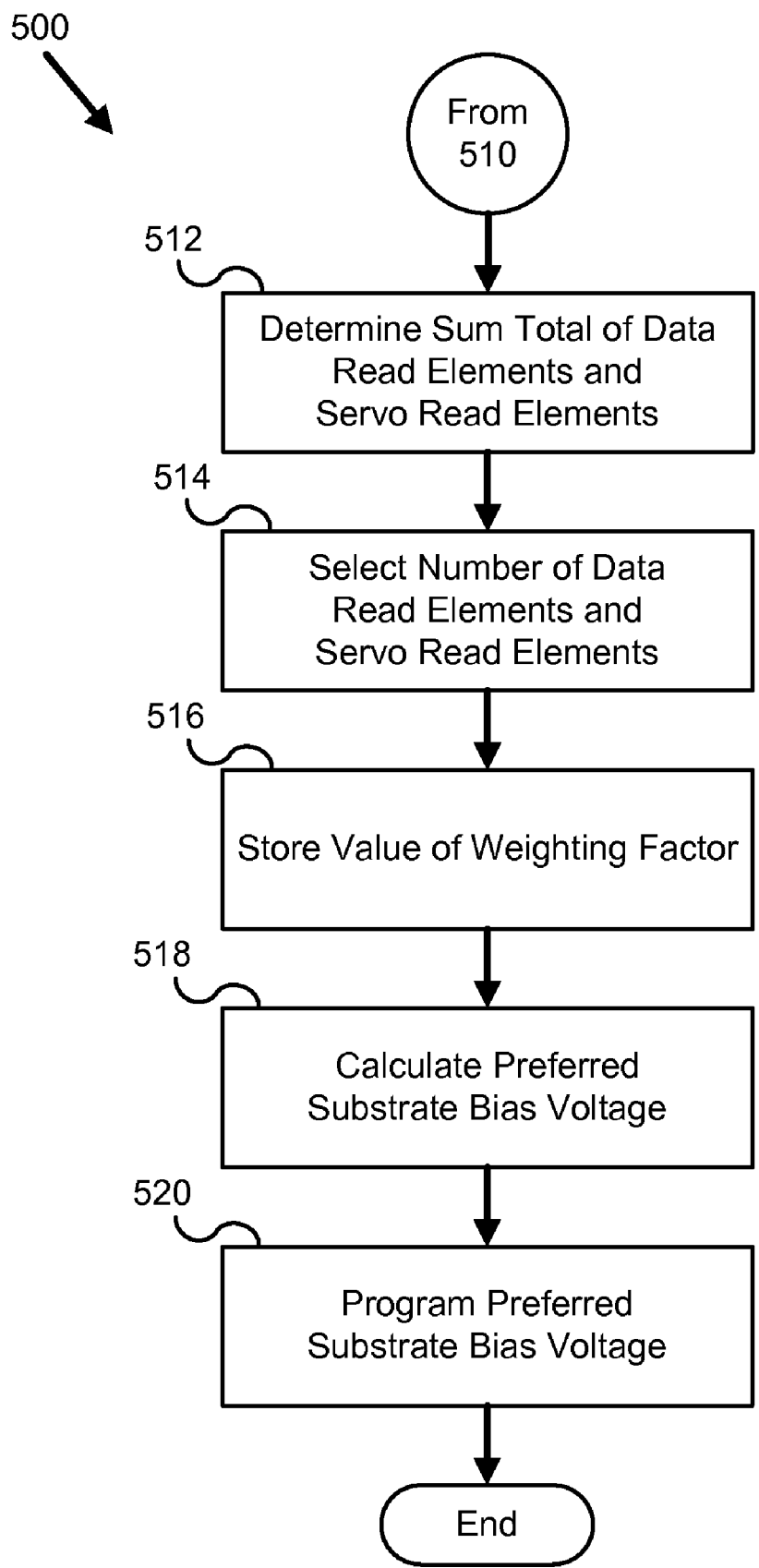

FIGS. 5A and 5B depict one embodiment of a controlling method 500 that may be implemented by the apparatus 300 of FIG. 3. For convenience, the method 500 is shown in a first part 500a and a second part 500b, but is referred to collectively as the controlling method 500. The method 500 is described herein with reference to the storage device 100 of FIG. 1.

The method 500 includes operations to select 502 a magneto-resistive (MR) data read element 124 or MR servo read element 126 for measuring, measure 504 a read element resistance, $R_h$ 210, determine 506 whether all reader elements have been measured, calculate 508 an MR midpoint voltage, and determine 510 whether all MR midpoint voltages have been calculated. The method 500 includes additional operations to determine 512 a sum total of data read elements 124 and servo read elements 126, select 514 a number of data read elements 124 and servo read elements 126, store 516 a value for a weighting factor, calculate 518 a preferred substrate bias voltage, and supply 520 the preferred substrate bias voltage.

Although the method 500 is depicted in a certain sequential order, for purposes of clarity, the storage device 100 may perform the operations in parallel and/or not necessarily in the depicted order.

The illustrated method 500 starts and a reader element is selected 502 for measuring. In one embodiment, the measure module 308 selects 502 the reader element to be measured. Next, the measure module 308, in one embodiment, measures 504 a resistance of a selected 502 reader element.

In response to the measure module 308 measuring 504 the resistance of the selected 502 reader element, the method 500 determines 506 whether the resistance of each of a plurality of reader elements associated with the module 118 has been measured 504. In one embodiment, the measure module 308 may be configured via the firmware 110 to determine 506 whether each of the plurality of reader elements has been measured 504. If the resistance of each element has not been measured 504, the method 500 repeats the operations of selecting 502 and measuring 504 the remaining elements.

Once the method 500 determines 506 that the resistance of each of a plurality of data read elements 124 and servo read elements 126 associated with the module 118 has been measured 504, the optimization method 500 then calculates 508 a head midpoint voltage for each data read element 124 and servo read element 126. In one embodiment, the midpoint module 302 is configured to calculate 508 the MR midpoint voltage, which may be stored in the table 116.

In response to the midpoint module 302 calculating 508 the head midpoint voltage of a reader element, the method 500 determines 510 whether the midpoint voltage of each of a plurality of reader elements associated with the module 118 has been calculated 508. In one embodiment, the midpoint module 302 may be configured via the firmware 110 to determine 510 whether the midpoint voltage of each of the plurality of head reader elements has been calculated 508. If the midpoint voltage has not been calculated 508 for each reader element, the method 500 repeats the operation of calculating 508 the midpoint voltage of the remaining reader elements.

Once the method 500 determines 510 the midpoint voltage of each of a plurality of data read elements 124 and servo read elements 126 associated with the module 118 has been calculated 508, the method 500 determines 512 a sum total of data read elements 124 and servo read elements 126. In one embodiment, the sum module 310 determines 512 the sum total of data read elements 124 and servo read elements 126 associated with the module 118.

Next, the method 500 selects 514 a number of data read elements 124 and servo read elements 126 from among the total of data read elements 124 and servo read elements 126 associated with the module 118. In certain embodiments, the select module 314 selects 514 all the data read elements 124 and servo read elements 126 from among the total of reader elements. Alternatively, the select module 314 may select 514 an exclusive number of the reader elements.

The method 500 next stores 516 a value for a weighting factor. As described above, the weighting factor gives preference to either data read elements 124 or servo read elements 126 in calculating the preferred substrate bias voltage. In one embodiment, the weighting module 312 may store 516 the value of the weighting factor.

Once the method 500 obtains the midpoint voltages for each reader element, the total number of reader elements, the selected 514 number of data read elements 124 and servo read elements 126, and the weighing factor, all these are used to calculate 518 the preferred substrate bias voltage. In one embodiment, the substrate module 304 calculates 518 the preferred substrate bias voltage according to the formula described above. In a further embodiment, the values used to calculate 518 the preferred substrate bias voltage and the value of the substrate bias voltage fill a table 116 that is subsequently stored in a memory device 112 for recovery and empirical data gathering purposes.

After the method 500 calculates 518 a preferred substrate bias voltage, that voltage value is supplied 520 to the substrate 420 via the circuit 400. In one embodiment, the program module 316 programs 520 the substrate 420 with the preferred bias voltage via the circuit 400. Once the program module 316 programs 520 the bias voltage, the depicted method 500 ends.

Figure 6:
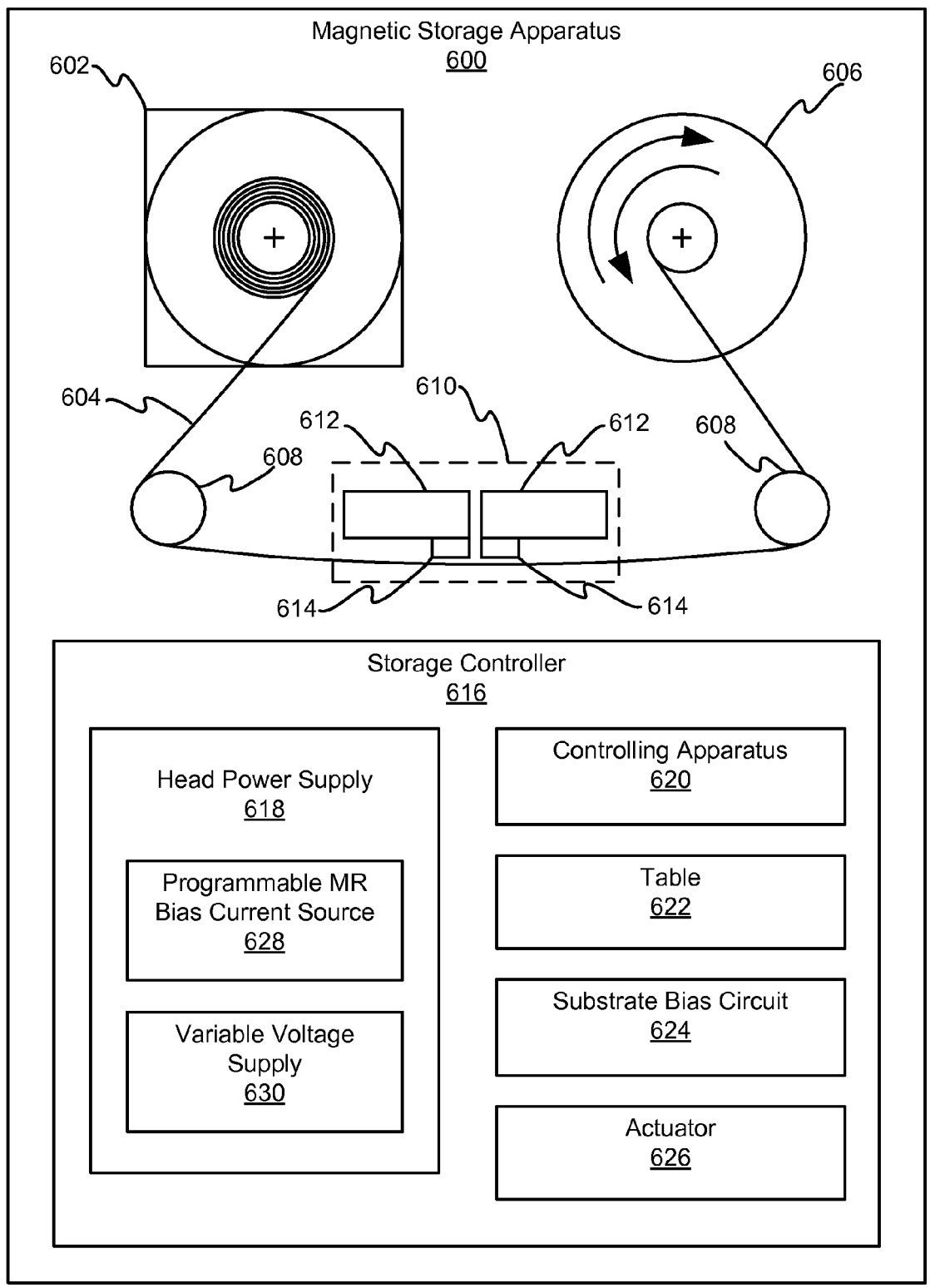
FIG. 6 is a schematic block diagram illustrating one embodiment of a magnetic storage device.

FIG. 6 depicts a schematic block diagram of one embodiment of a magnetic storage apparatus 600 that may be implemented in conjunction with the storage device 100 of FIG. 1. The illustrated magnetic storage apparatus 600 may be activated once a storage medium 106 is inserted into a storage device 100. The magnetic storage apparatus 600 includes a cartridge reel 602, a magnetic tape 604, a drive reel 606, a plurality of drive rollers 608, a magneto-resistive (MR) head assembly 610, and a storage controller 616.

The illustrated magnetic storage apparatus 600 depicts a magnetic tape drive for demonstrative purposes, but could equally apply to a hard disk drive, or other similar device. The cartridge reel 602 includes a storage medium 106, in this case, a magnetic tape 604. The magnetic tape 604 is pulled in both directions, from the cartridge reel 602 to the drive reel 606, and from the drive reel 606 to the cartridge reel 602, repeated until the storage medium 106 is filled. The magnetic tape 604 is fed through a series of drive rollers 608 that may contain flanges, or grooves, or both, in order to maintain optimal tape tension and to limit tape lateral transients.

For a tape drive, such as an IBM linear tape-open (LTO), the MR head assembly 610, which is substantially similar to the head assembly 104 of FIG. 1, is composed of two head modules 118, each consisting of an array of sensors on the substrate 614 that is substantially similar to the head substrate 420 of FIG. 4. The head 614 connects to a base 612 and is joined face to face with another head 614 so that read-while-write is operational in both directions. The head 614 is comprised of a certain number of write elements 122, data read elements 124 and servo read elements 126, all of which are fabricated on the substrate 120.

The illustrated storage controller 616 includes a head power supply 618, an controlling apparatus 620, a table 622, a substrate bias circuit 624, and an actuator 626. The storage controller 616 is substantially similar to the storage controller 102 of FIG. 1. In one embodiment, the storage controller 616 is a circuit board populated with integrated circuits and one or more memory devices 112. The storage controller 616 may be separate from the storage medium 106, such as in a tape drive. In another embodiment, the storage controller 616 may be physically attached to the storage medium 106, such as a hard drive.

The storage controller 616 may be configured to control the power requirements of the substrate bias voltage via a substrate power supply 618. Once the apparatus 620, which is substantially similar to the apparatus 300 of FIG. 3, determines the preferred substrate bias voltage value, the current required to produce the preferred substrate bias voltage is programmed in the programmable current source 628. The programmable current source 628 is substantially similar to the current source $I_b$ 404 of FIG. 4.

The MR elements may be biased via the Bias Circuit 624. The variable voltage supply 630 may be configured to supply the desired value of a substrate bias. The values calculated from the process of determining the preferred substrate bias voltage may be stored in the table 622 that is substantially similar to the table 116 of FIG. 1.

Once the head substrate 614 is programmed with the preferred substrate bias voltage, the head assembly 610 is positioned on the magnetic tape 604 for writing and reading operations via the actuator 626. The actuator 626, in one embodiment, responds to feedback of a servo read element 126 reading a pre-recorded servo track on the magnetic tape 604 in order to maintain alignment with the magnetic tape 604 and the writer elements 122 and data read elements 124.

The substrate bias voltage control imparted by embodiments of the present invention can have a real and positive impact on overall drive performance. In certain embodiments, the present invention improves the performance, and prolongs the life of data read elements 124 and servo read elements 126, which results in driving lower the total cost of ownership. In addition to optimizing substrate bias voltage, embodiments of the present invention afford a magnetic drive the ability to recalibrate the substrate bias voltage post-assembly, allowing dynamic assessment and correction.

In addition to compensating for wear, the present invention can also be used to compute preferred substrate voltage for the alternate modes of operation. For example, during read while write, servo readers in the writing module may be energized for so-called 'same gap servoing,' while the data readers in the same module may be powered down or turned off. In this case, data readers may not be used when calculating preferred substrate voltage.

In the downstream reading module during read while write, the servo readers are not used and may be powered down or turned off. As such, these may not be used when calculating the preferred substrate bias. In read only mode of operation, all the readers in one module may be turned off, while those in the reading module are all on, etc. Thus, it can be seen that the present invention can be used to address the various possible modes of operation for achieving a preferred but temporary, mode-specific substrate bias voltage.

The schematic flow chart diagrams included herein are generally set forth as logical flow chart diagrams. As such, the depicted order and labeled operations are indicative of one embodiment of the presented method. Other operations and methods may be conceived that are equivalent in function, logic, or effect to one or more operations, or portions thereof, of the illustrated method. Additionally, the format and symbols employed are provided to explain the logical operations of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. Additionally, the order in which a particular method occurs may or may not strictly adhere to the order of the corresponding operations shown.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus to dynamically control a substrate bias voltage, the apparatus comprising:
   a plurality of magnetic read elements associated with a head module;
   a midpoint module configured to calculate a midpoint voltage for each of the plurality of read elements associated with the head module as a function of a bias current and a head resistance;
   a substrate module coupled to the midpoint module, the substrate module configured to calculate a head substrate bias voltage for a substrate as a function of an average of the plurality of midpoint voltages; and
   a bias circuit that delivers the calculated head substrate bias voltage to the substrate.

2. The apparatus of claim 1, further comprising a program module coupled to the substrate module, the program module configured to program the substrate with the substrate bias voltage.

3. The apparatus of claim 1, further comprising a measure module coupled to the midpoint module, the measure module configured to measure a head resistance of each of the plurality of data read elements and servo read elements in association with the substrate.

4. The apparatus of claim 1, further comprising a sum module coupled to the substrate module, the sum module configured to determine a sum total of the data read elements and servo read elements of the plurality of head elements associated with the module.

5. The apparatus of claim 4, further comprising a select module coupled to the substrate module, the select module configured to select a number of data read elements and servo read elements from among the sum total of head reader elements associated with the substrate in order to calculate a substrate bias voltage for the selected number of head reader elements only.

6. The apparatus of claim 1, further comprising a weighting module coupled to the substrate module, the weighting module configured to store a value for a weighting factor that corresponds to a relative weight between the data read elements and the servo read elements in the calculation of the substrate bias voltage.

7. The apparatus of claim 1, further comprising a recalibration module coupled to the measure module, the recalibration module configured to recalibrate the substrate bias voltage.

8. The apparatus of claim 7, further comprising a recurrence module coupled to the recalibration module, the recurrence module configured to store a period of recurring recalibration.

9. A system to dynamically control a substrate bias voltage, the system comprising:
   a magnetic data storage device;
   a head substrate having a plurality of head elements;
   a storage controller that controls read-write operations of the plurality of head elements; and
   an apparatus coupled to the storage controller, the apparatus configured to determine a value of a substrate bias voltage for the substrate, the apparatus comprising:
      a midpoint module configured to calculate a midpoint voltage for each of the plurality of head elements as a function of a bias current and a head resistance; and
      a substrate module coupled to the midpoint module, the substrate module configured to calculate a head substrate bias voltage for a substrate as a function of an average of the plurality of midpoint voltages.

10. The system of claim 9, further comprising firmware coupled to the storage controller, the firmware configured to perform operations to derive the substrate bias voltage.

11. The system of claim 10, further comprising a bias circuit coupled to the firmware, the bias circuit configured to supply the substrate bias voltage to the substrate.

12. A signal bearing medium tangibly embodying a program of machine-readable instructions executable by a digital processing apparatus to perform operations to dynamically control a substrate bias voltage, the operations comprising:
   calculating a head midpoint voltage for each of a plurality of head elements associated with a head module as a function of a bias current and a head resistance; and
   calculating a substrate bias voltage for a substrate as a function of an average of the plurality of head midpoint voltages.

13. The signal bearing medium of claim 12, wherein the instructions further comprise an operation to program the substrate with the substrate bias voltage.

14. The signal bearing medium of claim 12, wherein the instructions further comprise an operation to measure a head resistance of each of the plurality of data read elements and servo read elements in association with the substrate.

15. The signal bearing medium of claim 12, wherein the instructions further comprise an operation to determine and select the number of data read elements and servo read elements of the plurality of head elements associated with the substrate.

16. The signal bearing medium of claim 12, wherein the instructions further comprise an operation to store a value for a weighting factor that corresponds to a relative weight between the data read elements and the servo read elements in the calculation of the substrate bias voltage.

17. An apparatus for storing magnetic data, the apparatus comprising:
- a head assembly coupled to a magnetic data storage device, the head assembly configured to perform read-write operations on a storage medium, the head assembly comprising a plurality of read elements;
- a midpoint module configured to calculate a midpoint voltage for each of the plurality of read elements associated with the head assembly as a function of a bias current and a head resistance;
- a substrate module configured to calculate a head substrate bias voltage for a substrate as a function of an average of the plurality of midpoint voltages;
- a bias circuit coupled to the head assembly, the bias circuit configured to deliver the head substrate bias voltage to a substrate; and
- a substrate power supply coupled to the bias circuit, the substrate power supply configured to power the bias circuit.

18. The apparatus of claim 17, further comprising a controlling apparatus coupled to the head assembly, the apparatus configured to be stored in firmware.

19. The apparatus of claim 17, further comprising a table coupled to the head assembly, the table configured to store data of the substrate bias voltage in a memory device.

* * * * *